No. 638,628. Patented Dec. 5, 1899.
J. F. EVERETT & A. KIRKMAN.
SELF INFLATING TIRE FOR BICYCLES.
(Application filed Mar. 21, 1899.)

(No Model.)

Inventors.
James Frederick Everett.
Arthur Kirkman.

UNITED STATES PATENT OFFICE.

JAMES FREDERICK EVERETT AND ARTHUR KIRKMAN, OF WALLINGTON, ENGLAND.

SELF-INFLATING TIRE FOR BICYCLES.

SPECIFICATION forming part of Letters Patent No. 638,628, dated December 5, 1899.

Application filed March 21, 1899. Serial No. 710,049. (No model.)

*To all whom it may concern:*

Be it known that we, JAMES FREDERICK EVERETT, civil engineer, and ARTHUR KIRKMAN, accountant, subjects of the Queen of Great Britain and Ireland, residing at Wallington, in the county of Surrey, England, have invented certain new and useful Improvements in Self-Inflating Tires for Bicycles and other Vehicles, (for which we have applied for a patent in Great Britain, No. 18,038, dated August 22, 1898;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to improvements in that class of self-inflating tires for bicycles and other vehicles in which one or more so-called "pumping-tubes" are employed in connection with the pneumatic tube or tire for the purpose of inflating the latter in an automatic manner by the mere weight of the rider and vehicle while in motion.

Figure 2:
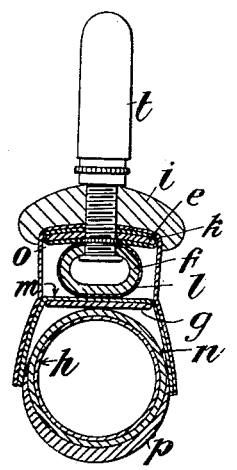
Figure 1:
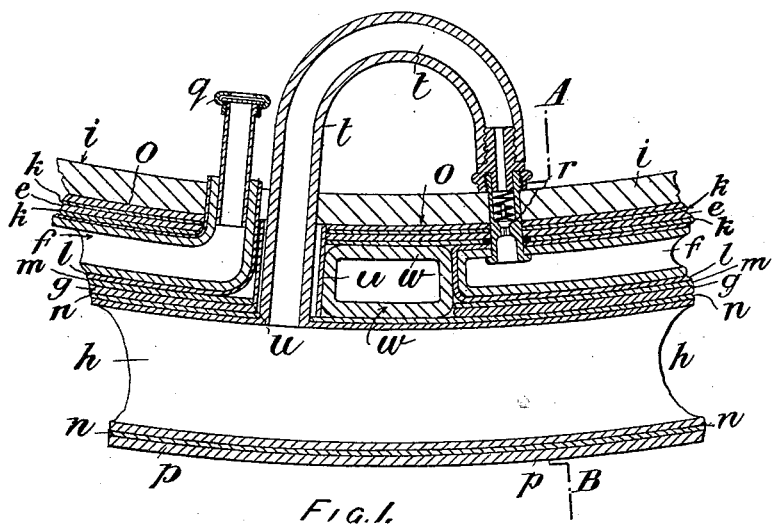
Figure 3:
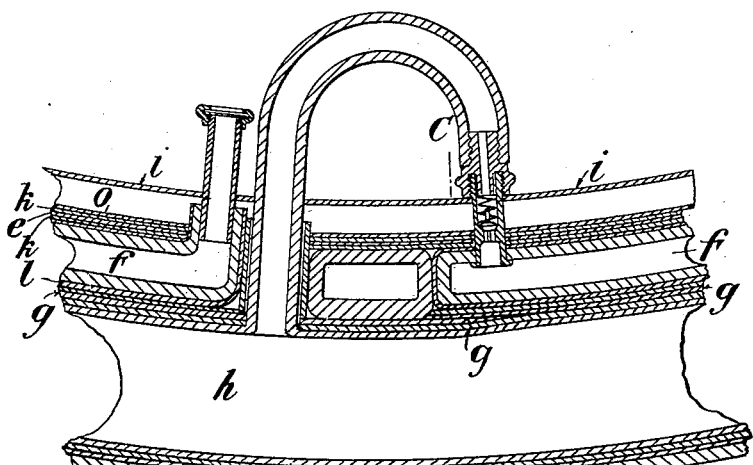

Figure 1 of the accompanying sheet of drawings represents part of a wheel-rim and a so-called "single-tube" tire in longitudinal section; and Fig. 2 is a transverse section thereof on the line A B, Fig. 1. Fig. 3 shows part of a wheel-rim and a so-called "double-tube" tire in longitudinal section; and Fig. 4 is a transverse section thereof on the line C D, Fig. 3.

Referring to Figs. 1 and 2, it will be seen that the invention consists, essentially, in providing a metallic or other band $e$ (hereinafter referred to as the "inner" band) between the rim and the pumping-tube $f$ and another such band $g$ (hereinafter referred to as the "outer" band) between the pumping-tube $f$ and the air-tube or pneumatic tire $h$. The inner band $e$ is mounted in the hollow of the rim $i$ and is or may be attached thereto, the ends being connected or abutting, but preferably so as to afford a smooth surface at the joint. This inner band $e$ serves to raise the pumping-tube away from the rim $i$, thus affording a flat surface on which the pumping-tube $f$ can operate and so as not to interfere with the nipples on the ends of the spokes or the spokes themselves and to cover any spoke or other holes there may be in the rim. The inner band $e$ is suitably made of aluminium and is or may be covered with canvas or other suitable material, as shown at $k$. The pumping-tube $f$ is also covered with canvas $l$ (see Fig. 2) or at least is made inextensible. The outer band $g$ is or may be of aluminium and inclosed with canvas $m$ or other suitable material, which is solutioned to the air-tube $h$, and the said band forms a medium for "compressing" the pumping-tube $f$, so to say, independently of the pneumatic tire, so that the pressure in the pumping-tube may be sensibly above the pressure in the air-tube $h$. The air-tube $h$ is covered with canvas $n$ or is otherwise made inextensible, and canvas $o$ is solutioned, so as to inclose the inner band, the pumping-tube, the outer band, and all or part of the air-tube, which is or may be provided with a thickened tread $p$. Air is admitted through a dust-cap or filter $q$ in the ordinary manner to the pumping-tube $f$, which does not extend quite all around the wheel, and as the wheel revolves the sides of the said tube $f$ meet and air is forced all around until it passes through the back-pressure valve $r$ by the pipe $t$ into the air-tube $h$. The pipe $t$ passes through the thimble $u$, which is attached to the outer band $g$, and the thimble $u$ further passes freely through a hole in the rim, so as to be in a manner attached thereto and yet permit of the free action of the outer band to effect the compression of the pumping-tube $f$, the other end of the outer band $g$ being free to move both radially and circumferentially. The space between the ends of the pumping-tube is or may be filled up with an india-rubber cushion $w$, or the ends of the said tube may be closer together.

Figure 4:
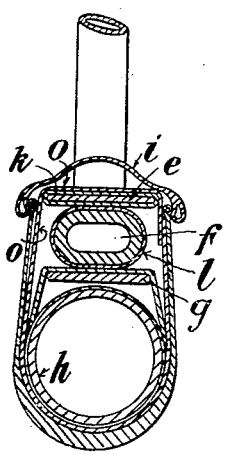

As shown in Figs. 3 and 4, the inner band $e$ is between the rim $i$ and the pumping-tube $f$ and the outer band $g$ between the said pumping-tube and the air-tube or pneumatic tire $h$. The inner band $e$ is mounted in the hollow of the rim $i$ and is or may be attached thereto, the ends being connected as aforesaid. This inner band $e$ is or may be covered with canvas, as shown at *k*, and the pumping-tube *f* is also covered with canvas *l*, as shown at Fig. 4, or at least is made inextensible. The outer band *g* is or may be covered with canvas on one or both sides, and in this construction is shown to overlap at its ends in such manner as not to nip the airtube *h*. The said ends may be loosely connected together by a stud and a slot or in any other convenient manner, if necessary. The canvas *o* surrounds the inner band, the pumping-tube, the outer band, and the air-tube, the edges of said band being solutioned or attached together in any convenient manner. The other parts of this construction are the same as described with reference to Figs. 1 and 2.

We claim—

1. A self-inflating tire, consisting of an airtube, a pumping-tube surrounding the rim of the wheel, means for admitting air to said pumping-tube and forcing such air to the airtube, and a band secured at one end only, arranged between the pumping and air tubes, substantially as set forth.

2. A self-inflating tire, consisting of an airtube, a pumping-tube, an outer band between the pumping-tube and the air-tube secured at one end only, an inner band surrounding the rim between the latter and the pumping-tube, and means for admitting air to the pumping-tube and forcing such air into the air-tube, substantially as set forth.

3. A self-inflating tire, consisting of an inextensible air-tube, an inextensible pumping-tube provided at one end with an air-inlet and at the other end with an air-passage to the pumping-tube, a check-valve in said passage, an outer band between the pumping-tube and the air-tube secured at one end only and an inner band surrounding the rim between the latter and the pumping-tube, substantially as set forth.

4. A self-inflating tire, consisting of an inextensible endless air-tube, an inextensible pumping-tube provided at one end with an air-inlet having a dust-cap and at the other end with an air-passage to the pumping-tube, a check-valve in said passage, an outer band between the pumping-tube and the air-tube, secured at one end only, and an inner band surrounding the rim between the latter and the pumping-tube, the whole being secured together, substantially as set forth.

5. A self-inflating tire, consisting of an inextensible endless air-tube, an inextensible pumping-tube provided at one end with an air-inlet having a dust-cap, and at the other end with an air-passage to the pumping-tube, a check-valve in said passage, an outer band between the pumping-tube and the air-tube secured at one end only, and an inner band surrounding the rim between the latter and the pumping-tube, the inner band, the pumping-tube, the outer band and the air-tube being secured together, and the whole being inclosed by an outer cover and the rim, substantially as set forth.

In testimony that we claim the foregoing as our invention we have signed our names in presence of two subscribing witnesses.

London, England, February 22, 1899.

JAMES FREDERICK EVERETT.
ARTHUR KIRKMAN.

Witnesses:
E. W. ECAILLE,
WALTER J. SKERTEN.